United States Patent [19]

Fraioli

[11] 3,898,097

[45] Aug. 5, 1975

[54] SECONDARY POWER CELL

[76] Inventor: Anthony V. Fraioli, 25 Coach Rd., East Setauket, N.Y. 11733

[22] Filed: Nov. 11, 1974

[21] Appl. No.: 522,581

[52] U.S. Cl. ............. 136/6 R; 136/6 LN; 136/6 LF
[51] Int. Cl.² ........................................ H01M 35/02
[58] Field of Search ........ 136/6 R, 6 LN, 6 LF, 6 F, 136/100 R, 83 T

[56] References Cited
UNITED STATES PATENTS

| | | | |
|---|---|---|---|
| 2,863,933 | 12/1958 | Minnick et al. | 136/6 LN |
| 3,432,349 | 3/1969 | Tragert | 136/6 F |
| 3,508,967 | 4/1970 | Lyall et al. | 136/6 LN X |
| 3,578,500 | 5/1971 | Maricle et al. | 136/6 LN |
| 3,639,174 | 2/1972 | Kegelman | 136/6 LN |
| 3,644,145 | 2/1972 | Fraioli et al. | 136/6 LN |
| 3,730,771 | 5/1973 | Tannenberger et al. | 136/6 LN |
| 3,773,557 | 11/1973 | Mead | 136/6 LF |
| 3,773,558 | 11/1973 | Charbonnier et al. | 136/6 LN |
| 3,833,420 | 9/1974 | Will | 136/6 R |

Primary Examiner—John H. Mack
Assistant Examiner—C. F. LeFevour

[57] ABSTRACT

A secondary electrochemical power-producing cell is described which contains an alkali metal or alkaline earth metal (e.g., lithium) anode having an energetically homogeneous amalgamated surface film saturated with anode metal atoms. The cell cathode collector is preferably coulombically asymmetrical to permit, during recharge, the reforming of gravimetrically deformed or sagged anodes.

7 Claims, 4 Drawing Figures

SECONDARY POWER CELL

BACKGROUND OF THE INVENTION

This invention relates to electrochemical power-producing cells. More particularly, it relates to a power cell containing an alkali metal or alkaline earth metal anode having a homogeneous surface upon which the previously discharged metal ions can be uniformly redeposited when the cell is charged. Redeposition of the discharged metal ions upon the anode in this manner provides secondary cell capability in heretofore primary cell systems.

The need for portable, packaged energy conversion systems of improved capabilities is becoming an increasingly important requirement of our technological society. Although mobility has been the keynote of societal development, it has been attained at the expense of fossil fuel reserves. With an increasing population and its attendant increase in the consumption of electrical energy, both on a per capita and aggregate basis, new fossil fuel sources cannot be found nor old ones developed at a rate sufficient to meet projected demands. The development of nuclear technology as a means of generating electric power will increase, not only to satisfy consumer demand, but also to lessen the dependence on fossil fuels. Nevertheless, extensive research and development in the field of electric batteries capable of supplanting the internal combustion engine are both necessary and desirable to further lessen our dependence on fossil fuels, especially petroleum. An attractive side-benefit of such research and development, particularly in the area of intra-city public and private vehicular applications, is the elimination of the pollution caused by the exhausted oxidation products of petroleum fuels.

In one of the more fruitful developments in electric battery technology, the lithium cell is finding practical application in non-aqueous, high energy density battery systems. Lithium, the lightest metal in the Periodic Table of the Elements (density 0.53 gram per cubic centimeter), is over twenty-one times lighter than lead, and its use as an electrode has been projected to achieve high energy-density performance on a weight basis, depending on the counter electrode reaction. For example, according to N. H. Seiger et al., *Proceedings of the 21st Annual Power Sources Conference*, pages 45–51 (1967), an experimental lithium anode-nickel fluoride cathode battery containing a mixture of propylene carbonate and $KPF_6$ as the electrolyte gives theoretical energy densities of up to 620 watt-hours per pound, based solely on chemical reactant weights. Even assuming a 50 percent reduction in efficiency in allowing for the weight of the electrolyte, spacers, insulators and container, such a battery still compares favorably with the 10 to 12 watt-hours per pound energy densities of conventional lead-acid battery systems. The lithium-sulfur dioxide ($SO_2$) system disclosed, for example, in U.S. Letters Pat. Nos. 3,423,242 and 3,551,205, is one of the first practical lithium battery systems to have an adequate shelf-life and useful performance under load. Such a battery has actually been found to deliver 135 watt-hours per pound in a fabricated D-cell configuration. Larger configurations are expected to be even more efficient since the container weight factor would only increase as a function of the square of the battery size, whereas the electrical capacity of the system on a volumetric basis would increase as a function of the cube of the battery size. More recently, a chlorine-substituted homolog of $SO_2$, namely, thionyl chloride ($SOCl_2$), and phosphoryl chloride ($POCl_3$), have been found to be efficient cathode depolarizers as described by Auborn et al., in a paper entitled "Inorganic-Electrolyte-Lithium Cells" published in *Abstracts of the Electrochemical Society Fall Meeting*, Boston, Mass. (Oct. 7–11, 1973), Volume 73–2, pages 143–144 (Abstract No. 58).

Heretofore, no practical way has been found to recharge spent or partially discharged lithium-organic electrolyte or lithium-inorganic electrolyte (non-aqueous) batteries without developing an undesirable spongy, non-adherent deposit of lithium on the relatively dense metal negative electrode substrate. As a result, practical lithium/non-aqueous electrolyte battery systems have up until now been limited to primary cell applications.

In attempting to overcome the aforementioned drawback in the use of lithium batteries as secondary cells, several approaches to the problem have been tried with varying degrees of success. Thus, in U.S. Letters Pat. No. 3,531,324, secondary lithium cells are disclosed which employ fused salt electrolytes in conjunction with molten lithium anodes and molten cathode mixtures. The geometry and physical state of the anode are such that even if a spongy deposit of lithium droplets were to form on the surface of the molten anode pool during recharging, the surface energetics would cause the droplets to coalesce and be drawn into the body of the liquid. An analogous approach to secondary lithium battery construction is described in Canadian Pat. No. 828,306. In this aqueous battery, the anode is in the form of a pool or pouch consisting of an alkali metal or alkaline earth metal amalgam. At relatively low (i.e., unsaturated) concentrations in the amalgam, the activity of the electrode metal is reduced and self-discharge by reaction with water and consequent evolution of hydrogen are avoided. Because of the liquid nature of the anode amalgam, surface heterogeneities caused by spongy deposition of electrode metal during battery charging are eliminated, the "surface" deposit being immediately miscible with the liquid alloy phase. In yet another example of prior attempts at formulating a secondary lithium cell, Rightmire et al., in an article entitled "Fast Charge Molten Salt Batteries" published in *Proc. 21st Annual Power Sources Conf.*, pages 42–45 (1967), describe a lithium anode for use in non-aqueous molten-salt cells formed by dissolving the lithium in a host lattice of aluminum metal until the concentration is reached corresponding to the interstitial alloy $Li_2Al$. During recharge, a surface film of lithium, whether spongy or adherent, is not allowed to form. Instead, the aluminum-containing surface of the electrode becomes "lithiated" whereby inward diffusion of the lithium metal proceeds until saturation is reached at the previously mentioned alloy concentrations. More recently, Yao et al., in a paper entitled "Solid Lithium-Aluminum Alloy Electrode in High Temperature Secondary Cells" published in *Extended Abstracts of the Electrochemical Society Fall Meeting*, Boston, Mass. (Oct. 7–11, 1973), volume 73–2, pages 35–39 (Abstract No. 12), describe how the lithium-aluminum anode operates in high temperature (400°–450°C.) molten sulfur secondary battery systems.

The above-described known methods of constructing lithium anodes, while achieving a certain measure of success in avoiding the deposition of metal in sponge-like form on the lithium anode during the charge cycle, nevertheless are each subject to particular drawbacks. In the case of lithium batteries involving the use of fused salt electrolytes in conjunction with molten electrodes there is the obvious problem, not easily or economically solved, of fabricating cells, especially small cells intended for use in portable appliances, whose components are necessarily maintained at the high temperatures necessary to reduce the cell reactants to their molten state. On the other hand, battery systems involving the use of electrodes wherein the lithium is alloyed with another metal which is electrically conductive but chemically inactive under conditions of cell operation (e.g., mercury, aluminum) suffer from low coulombic efficiency on a weight basis due to the dilution of the lithium with inert metal. Thus, the presence of aluminum in the above-described $Li_2Al$ anode lowers the coulombic efficiency of the electrode to one-third that of pure lithium.

A need has therefore existed for a battery system in which all of the advantages inherent in the use of lightweight alkali metal or alkaline earth metal anodes (e.g., lithium) are realized while at the same time avoiding the aforementioned drawbacks heretofore confronting the industry in the design and operation of such cells.

Accordingly, it is an object of the present invention to provide an electric power cell containing an alkali metal or alkaline earth metal anode such as a lithium anode having a homogeneous surface upon which the previously discharged metal ions can be uniformly deposited when the cell is recharged.

Another object is to provide a secondary or rechargeable power cell containing a solid alkali metal or alkaline earth metal-containing anode (e.g., a lithium anode) which has the maximum coulombic efficiency characteristic of a pure lithium electrode.

These and other objects of the present invention as well as a fuller understanding of the advantages thereof can be had by reference to the following detailed description and claims.

SUMMARY OF THE INVENTION

The foregoing objects are achieved according to the present invention, which comprises a rechargable non-aqueous electrochemical power-producing cell including a pure solid alkali metal or alkaline earth metal anode having a homogeneous amalgamated surface maintainable during both the discharge and charge cycles.

In accordance with the invention, a secondary electrochemical power-producing cell has been discovered which comprises, in combination:

a. a solid alkali metal or alkaline earth metal anode disposed on a copper screen. The screen is coated or "co-expanded" with a metal alloyable to both mercury and anode metals. The outer surface of the anode is coated with an energetically homogeneous film of mercury metal saturated with anode metal atoms, i.e., alkali metal atoms or alkaline earth metal atoms;

b. a non-aqueous electrolyte comprising a cathode depolarizer miscible in the electrolyte;

c. a salt of the anode metal which provides ionic transfer and cell conductivity in the electrolyte; and d. a porous cathode grid adapted to collect the reduction products of the cell discharge reaction.

Desirably, the anode metal atoms are essentially lithium atoms and the metal used in forming the co-expanded anode screen which must be alloyable to both mercury and the anode metal can be aluminum or magnesium foil. The cathode depolarizer electrolyte is a Lewis acid, of which sulfur dioxide ($SO_2$), thionyl chloride ($SOCl_2$) and phosphoryl chloride ($POCl_3$) are typical and preferred examples. Generally, the salt of the anode metal is formed as the reduction product of the cell discharge reaction and is preferably the anode metal salt of the cathode depolarizer, e.g., $Li_2S_2O_4$ in the case of a lithium metal anode and sulfur dioxide depolarizer.

In assembling the secondary power cell according to the invention, the mercury required to form the energetically homogeneous amalgamated anode surface film can be added to the electrolyte as a mercurous salt in an amount which is just sufficient to provide substantially complete anode surface amalgamation. In forming the amalgamated film, the mercurous salt reacts directly with the anode metal, resulting in the replacement of the mercurous salt in the electrolyte by a substantially equivalent amount of anode metal salt.

It is a feature of the present invention that the cathode is coulombically asymmetrical, i.e., has asymmetrically excess capacity with respect to the gravitational axis. It has been discovered that this asymmetry permits the reforming of gravimetrically deformed or sagged anodes during recharging of the cell. Thus, the cathode, when fully discharged and then recharged, preferentially redistributes the anode metal onto those sections of the anode screen from which the metal was gravitationally displaced.

The combination of aluminum or magnesium foil and copper in the anode screen or grid is important in re-seeding lithium deposition over all copper grid surfaces of the anode following discharge. In prior attempts at using aluminum metal in Li-Al anodes, this re-seeding was accomplished at the expense of being limited to the quantity of lithium that could be deposited (up to $Li_2Al$ stoichiometrically). In the recharging of the power cell of the present invention, the thin aluminum or magnesium foil quickly saturates to $Li_2Al$, and the redeposition is continued beyond this point whereby the mobile mercury migrates away from the aluminum or magnesium surface, leaving approximately 100 percent, dense lithium beneath it and evenly redeposited on all surfaces of the previously lithium-depleted anode.

Without wishing to be bound by theory, it is believed that the energetics of the ideal lithium cell electrode, the prior art electrodes and the lithium cell of the present invention can be broken down into four cases. Case I represents the condition occurring in the deposition of spongy masses of non-adherent metallic particles onto dense metallic anode substrates during an attempted cell recharge resulting in unsuccessful anode reforming. It is believed that this is caused by nucleation of metal deposits on active sites of a heterogeneous surface. The electron transfers to the growing particles are more readily accomplished here than at less active neighboring sites. This mechanism postulates the development of more active sites on the growing particles which become operative in the formation of new particle growth after a certain size or configuration of the first particle has been attained. Case II represents the ideal situation wherein the redeposited anode material forms a dense adherent layer physically and electrochemically indistinguishable from the original anode surface. This reflects ideal rechargeable anode behavior. Case III represents the known lithium — aluminum alloy anode mentioned earlier, wherein the aluminum acts as a host—lattice for the inwardly-diffusing lithium atoms. In comparing the thermodynamic (Gibbs) free energy, $G$, of the final states of the Case I and Case II processes:

1. $G_I = G_{II} + \gamma dA$ where $\gamma$ is the surface tension of the lithium metal, and $dA$ is the increase in area it offers over that of the collapsed system. Thus, the free energy, $G_I$, of the final state of Case I is greater than the free energy, $G_{II}$, of the final state of Case II, by an amount equal to the surface free energy of the particulate deposit, $\gamma dA$. Comparing the final states of Case II and Case III:

2. $G_{II} = G_{III} + \Delta H_{mix}$ wherein the heat of mixing, $\Delta H_{mix}$, is large and positive due to the strong interaction existing between components in interstitial alloy formation. Thus, $G_{II}$ is greater than $G_{III}$ by the heat of mixing term, and

3. $G_I > G_{II} > G_{III}$.

The above inequalities in the free energies of the final states indicate the order of the relative instabilities of the Case I, Case II and Case III processes: energetically the particulate anode metal deposit would rather not form at all, but would rather find itself in the condition of the dense film on the anode substrate. According to the present invention, by providing a uniformly homogeneous surface for metallic deposition, and by providing mobility for the electrolytically deposited, adsorbed lithium atoms, such a dense anode surface can be reformed during recharging of the lithium power cell system.

An amalgamated surface offers the most uniform force field, i.e., a homogeneous surface, and will induce non-preferred orientation or crystal growth on its surface. When added in sufficiently small quantity to form a surface film only, the mercury quickly saturates with dissolved lithium atoms, which at saturation, have the same chemical potential at the "standard state" solid single crystal material at the same standard state temperature; thus the EMF and cell electrochemistry are identical to a non-amalgamated lithium cell at the same temperature.

Again from a free energy standpoint, the deposition of lithium on an amalgamated anode surface offers a Case IV condition. Ignoring the pre-existence of a mercury coating on the substrate as we did the pre-existence of a periodic lattice with available potential wells in the Case III example, we can qualitatively compare $G_{II}$ and $G_{IV}$ by considering $\Delta G_{IV}$ to operate over two stages: first the deposition of a highly-energetic spongy mass onto the amalgamated surface, and then the collapse of this into the saturated liquid alloy film. Thus 4. $G_{II} = G_{IV} + \Delta H_{soln}$ Comparing equations (2) and (4), and considering that the $\Delta H_{soln}$ is less than $\Delta H_{mix}$, since greater freedom of mobility remains for the lithium atoms in the amalgam than for those locked into interstitial positions in the aluminum alloy, it follows that

5. $G_{II} > G_{IV} > G_{III}$

Energetically then, Case IV does not offer as great a free energy change (driving force for reaction) as does the formation of a Case III prior-art interstitial-alloy anode; however it does offer a mechanism for an energetically-favorable process to form a dense continuous anode on recharge.

The present invention is based upon the discovery that a monomolecular layer of mercury on each surface of a lithium anode is sufficient to provide the required surface characteristics. Preferably, a somewhat thicker layer is used to account for mercury diffusion into the bulk. The saturated amalgam film rides on the surfaces of the lithium foil (where it is required to maintain a condition of minimum free energy) as the foil decreases in thickness during discharge, and increases in thickness during charge. Due to prior bulk diffusion, an excess of free mercury will be liberated to the surface as thickness decreases during discharge, and an ensuing problem is encountered in an anode sag due to a fixed orientation of the electrode in the earth's gravitational field. This problem is avoided by fabricating the opposing counter-electrode as in the manner of the present invention in the accompanying drawings.

DESCRIPTION OF THE DRAWINGS

In the drawings.

In FIG. 1, a partially-discharged anode 1 has sagged due to surface accretion of mercury and prolonged fixed orientation in a gravitational field. The opposing cathode 2 contains excess capacity in a portion 3 of the cathode opposite from the direction of the applied gravitational field. The excess capacity can be provided by geometric means, as is shown in the wedge-shaped construction of the cathode, or by incorporation of coulombically inert zones in a cathode of rectangular cross-section. On useful low-impedance discharge the anode 1 will disintegrate and the cathode 2 will saturate with lithium salt 4 as shown in FIG. 2. Continued short-circuiting of the cell will transfer last traces of lithium 5 from the slumped region of the anode 1 to that portion 3 of the cathode 2 farthest from it, following a higher impedance, long-electrolyte path 6 to the available cathode section, as is shown in FIG. 3. FIG. 4 shows how a rapid charge will preferentially redistribute the lithium to the pre-sagged configuration on the anode screen 7. The deposition on the anode follows the shortest path 8 through the electrolyte, and the metal is "thrown" onto the anode directly opposite to where the concentration of discharge — product lithium salt localized in the cathode 2 is the greatest.

DESCRIPTION OF PREFERRED EMBODIMENTS

Figure 1:
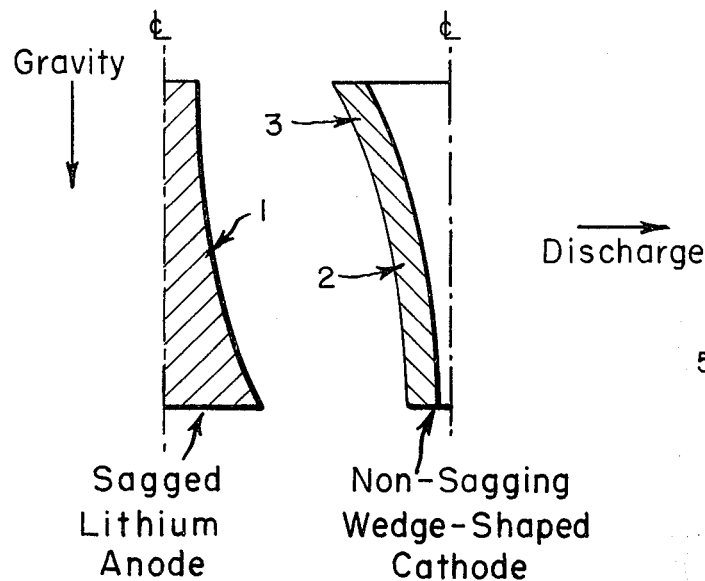
FIGS. 1, 2, 3 and 4 depict the four stages involved in reshaping slumped anodes in an anode-limited (excess cathode capacity) cell construction according to the present invention.
Figure 2:
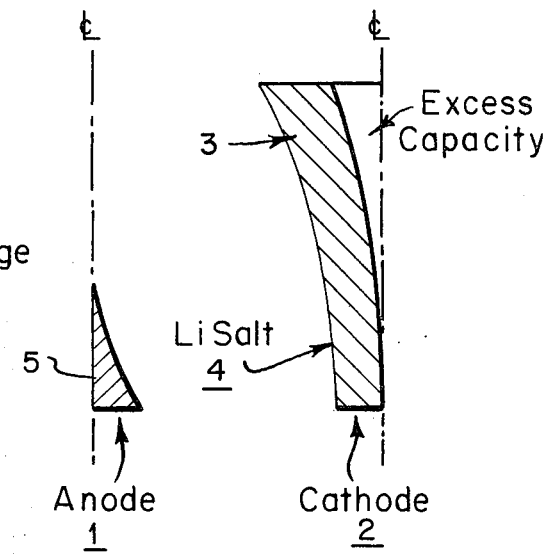
Figure 3:
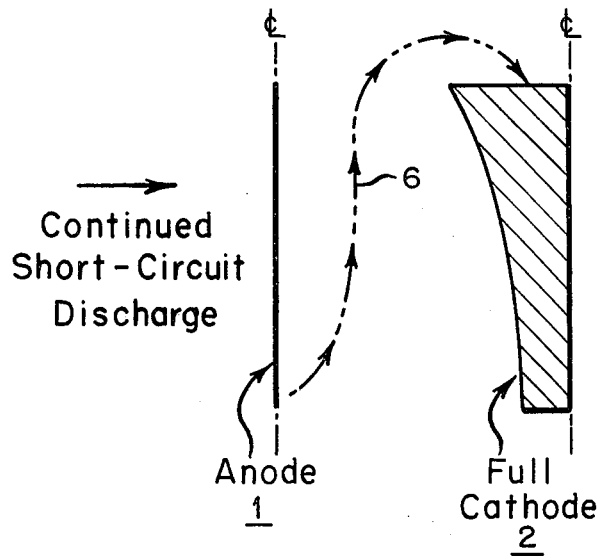
Figure 4:
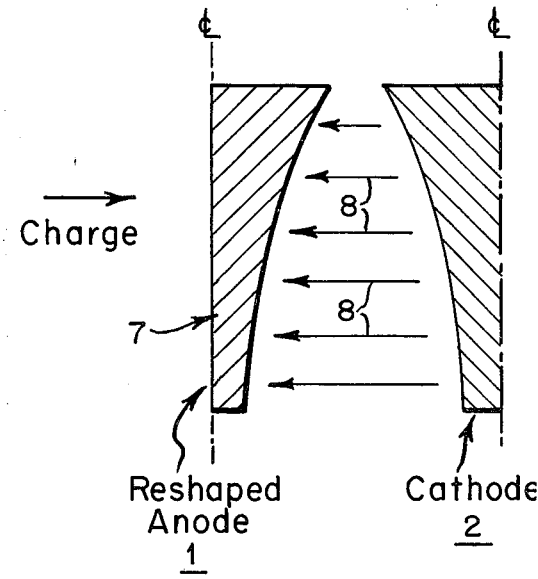

A preferred method of practicing the present invention incorporates a composite anode screen: a base layer of copper or other conductor co-laminated with aluminum or other lithum alloy-former such as magnesium, will "seed" the redeposition of lithium uniformly over the screen surface, and act to hold by amalgamation the mercury film residue left on total discharge. Cleaned and degreased seven-mil OFHC copper foil, doubly-faced with two-mil 1199 aluminum foil, will form a co-welded laminated structure during the shearand-forming operation involved in producing expanded-metal screens. Lithium anodes are formed by imbedding such a copper-based anode screen (with a terminally extended copper foil interconnection tab) between two sheets of lithium foil, contact welding the opposed foils through the screen pattern by roller or platten press operations.

Procedures for amalgamating the lithium anode described above are presented in the following examples.

EXAMPLE 1

Dipping in a Hg° Pool

This operation is performed in a dry box prior to winding or cell-stack assembly. The formed foil anode with imbedded anode screen is quickly immersed in a tray of liquid mercury and manipulated to promote complete coverage. While providing good visual control of surface-amalgamation, control of the amount of mercury picked up by the anode surfaces is less satisfactory than that described in subsequent examples.

Example 2

Salt Reduction from Solution; Tray Drip

Within a dry box (as in Example 1), the formed foil anode is immersed in a tray of solution of mercurous bromide in a mixed solvent of propylene carbonate and acetonitrile, saturated by bubbling with $SO_2$. Reduction of the mercurous bromide occurs on the surface of the lithium foil according to the reaction:

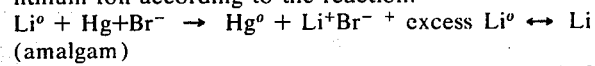

and produces a surface amalgam. Qualitative control of the amount of mercury reduced is effected by controlling the immersion time; more quantitative control is obtained by reacting a measured amount of mercurous salt in the solution to completion.

Example 3

Direct Compounding of Hg Into Electrolyte Formulation

For a given anode-limited cell construction, where the fully charged anode thickness and exposed surfaces are fixed, as is the volume of electrolyte to be added to provide for cell conductivity and discharge reaction, the mercurous ion can be compounded into the electrolyte formulation in lieu of an equivalent amount of lithium ion in the lithium bromide salt. In the electrolyte described in the above-cited U.S. Pat. No. 3,551,205, the constituents are listed in column A of Table I:

cell electrolyte composition becomes indentical to that described by the prior art, or any preferred modification thereof. In the process, 0.342 moles (68.6 g.) of mercury metal has been reduced onto the surface of the exposed lithium anode. Depending upon its designed capacity, a given cell may contain only one one-hundredth of the amount of electrolyte in the above formulation of the present invention. The above formulation is not meant to show the amount of mercurous bromide to be used in a specific design, but rather to show how it may be incorporated into the amalgamated anode cell construction without affecting conventional electrolyte compositions, and thereby function to provide secondary cell capability in heretofore primary cell systems.

The foregoing examples are presented for the purpose of illustrating the invention and its attendant advantages. It is understood that changes and variations in the various cell constructions described in the examples can be made without departing from the scope of the present invention as defined in the following claims.

I claim:

1. A secondary electrochemical power-producing cell comprising, in combination:
   a. a solid alkali metal or alkaline earth metal anode disposed on a copper screen coated with a metal alloyable to both mercury and anode metal, said anode having an energetically homogeneous amalgamated surface film saturated with anode metal atoms selected from the group consisting of alkali metal atoms and alkaline earth metal atoms;
   b. a non-aqueous electrolyte comprising a cathode depolarizer miscible in said electrolyte;
   c. a salt of the anode metal which provides ionic transfer and cell conductivity in the electrolyte, said salt constituting the reduction products of the cell discharge reaction; and
   d. a porous cathode grid adapted to collect the reduction products of the cell discharge reaction.

2. A secondary electrochemical power-producing cell according to claim 1 wherein:
   the anode metal atoms consist essentially of lithium atoms;
   the cathode depolarizer is a Lewis acid selected from the group consisting of thionyl chloride, sulfur dioxide, and phosphoryl chloride; and
   the salt of the anode metal is a lithium salt of the cathode depolarizer.

3. A secondary electrochemical power-producing cell according to claim 2 wherein the mercury required to form the energetically homogeneous amalgamated anode surface film is introduced in the electrolyte as a mercurous salt.

4. A secondary electrochemical power-producing cell according to claim 2 wherein the energetically homogeneous amalgamated anode surface film is formed Table I

| Material | Electrolyte Compositions A(U.S. Pat. No. 3,551,205) | B (Present Invention) |
|---|---|---|
| 1. Acetonitrile | 164.2 g. | 164.2 g. |
| 2. Propylene Carbonate | 130.5 g. | 130.5 g. |
| 3. LiBr | 160 g. (1.842 moles) | 130.3 g. (1.500 moles) |
| 4. $SO_2$ | 1073 g. | 1073 g. |
| 5. HgBr | — | 96.0 g. (0.342 moles) |

The column B formulation of the present invention is designed to liberate 0.342 moles of LiBr by reacting an equivalent amount of mercurous bromide with a calculated excess of lithium anode according to the reaction depicted in Example, 2, above. After reaction, the after cell assembly by direct reaction of the anode metal with a mercurous salt, the mercurous salt being added to the non-aqueous electrolyte in an amount sufficient to provide substantially complete anode surface amalgamation, said mercurous salt being replaced by a substantially equivalent amount of anode metal salt following amalgamation.

5. A secondary electrochemical power-producing cell according to claim 1 wherein the cathode is coulombically asymmetrical to permit the reforming of gravimetrically deformed or sagged anodes during recharging of the cell.

6. A secondary electrochemical power-producing cell according to claim 5 wherein the cathode has asymmetrically distributed capacity, said cathode when fully discharged and then recharged, preferentially redistributes the anode metal onto those sections of the anode screen from which the metal was gravitationally displaced.

7. A secondary electrochemical power-producing cell according to claim 1 wherein the metal alloyable to both mercury and anode metal coated on the anode screen is selected from the group consisting of aluminum and magnesium.

* * * * *